United States Patent
Boschi et al.

(10) Patent No.: US 10,671,027 B2
(45) Date of Patent: Jun. 2, 2020

(54) ELECTRONIC COMPONENT MONITORING METHOD AND APPARATUS

(71) Applicant: Intel Corporation, Santa Clara, CA (US)

(72) Inventors: Gabriele Boschi, S. Leonardo in Trep. Lucca (IT); Alessandro Campinoti, Pisa (IT); Jennifer Wang, Tempe, AZ (US); Divya Gupta, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 3 days.

(21) Appl. No.: 16/013,568

(22) Filed: Jun. 20, 2018

(65) Prior Publication Data
US 2019/0049905 A1  Feb. 14, 2019

(51) Int. Cl.
| | |
|---|---|
| *G05B 9/02* | (2006.01) |
| *G05B 15/02* | (2006.01) |
| *G06F 13/42* | (2006.01) |
| *G05D 1/00* | (2006.01) |

(52) U.S. Cl.
CPC .............. *G05B 9/02* (2013.01); *G05B 15/02* (2013.01); *G06F 13/4282* (2013.01); *G05D 1/0088* (2013.01); *G06F 2213/0016* (2013.01)

(58) Field of Classification Search
CPC ....... G05B 9/02; G05B 15/02; G06F 13/4282; G06F 2213/0016; G05D 1/0088; G05D 2213/0016; G06Q 50/22; G06Q 10/06; G06Q 10/10
USPC ............................................................ 700/81
See application file for complete search history.

(56) References Cited

U.S. PATENT DOCUMENTS

| | | | | |
|---|---|---|---|---|
| 2006/0236150 | A1* | 10/2006 | Lintz, Jr. ............. | G06F 11/1417 714/6.13 |
| 2015/0347325 | A1* | 12/2015 | Hutchison ............... | G06F 13/10 710/19 |
| 2015/0378960 | A1* | 12/2015 | Huffman ............. | G06F 13/4045 710/300 |
| 2017/0039163 | A1* | 2/2017 | Sejpal ................ | G06F 13/4291 |
| 2017/0369067 | A1* | 12/2017 | Saigusa ........... | B60W 30/18163 |

* cited by examiner

*Primary Examiner* — Rocio Del Mar Perez-Velez
*Assistant Examiner* — Alicia M. Choi
(74) *Attorney, Agent, or Firm* — Schwabe, Williamson & Wyatt, P.C.

(57) ABSTRACT

In embodiments, a system may comprise a circuit component to perform a function; and a supervisor component (e.g., a safety component) coupled to the circuit component to monitor proper functioning of the circuit component. The circuit component may be configured to initiate provision of diagnostic information to the supervisor component, or to indicate to the safety component whether the circuit component will be responsive to a query from the safety component for diagnostic information.

21 Claims, 5 Drawing Sheets

Note 1: Platform Reset or Config of Component will always enter Reset state from any state except Power Off state Note 2: While not shown, all states may also transition to Power Off state instantly, if power is suddenly removed

ELECTRONIC COMPONENT MONITORING METHOD AND APPARATUS

TECHNICAL FIELD

The present disclosure relates to the fields of computing, reliability and safety, in particular, to the reliable and safe operation of mission critical or safety sensitive systems. More specifically, the present disclosure relates to electronic component monitoring methods and apparatuses in these systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mission critical or safety sensitive systems like computer-assisted or autonomous driving (CA/AD) systems in CA/AD vehicles, industrial systems, software defined cockpit systems, and so forth, often integrates functional-safety enabled components. For these systems, it is necessary for the proper functioning of these components to be monitored.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
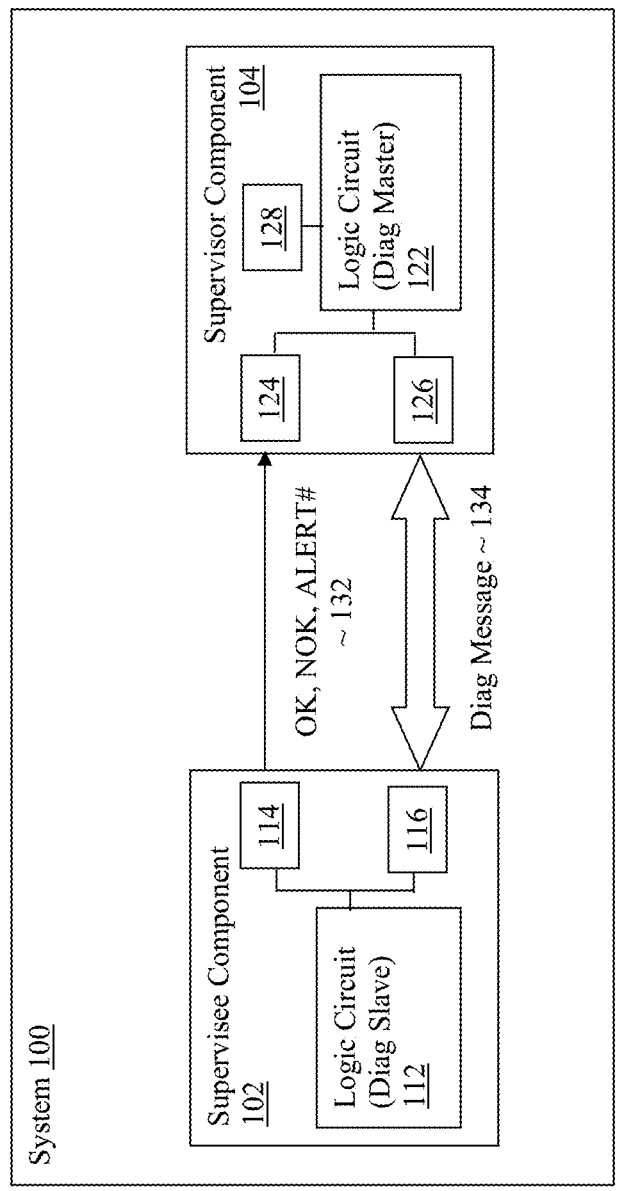
FIG. 1 illustrates an overview of a system incorporated with the electronic component monitoring technology of the present disclosure, in accordance with various embodiments.

The present disclosure presents electronic component monitoring methods and apparatuses for functional-safety enabled components integrated in mission critical or safety sensitive systems, such as CA/AD systems in CA/AD vehicles, industrial systems, software defined cockpit systems, and so forth. Prior art systems lack a standardized interface for every platform component and what safety protocol pertains when each of these components interacts with the supervisor component. Each platform component may have Reset, Powered on, Powered off and Self diagnostic states, and if a component is transitioning from one state to another, it might be busy but functionally operational. During this window if the supervisor component (e.g., a Safety island or monitor) comes and probes the component, finds it unresponsive, it may result in false alarm that the component is not operational.

In embodiments, a mission critical or safety sensitive system may include a circuit component to perform a function or a task; and a supervisor component (such as a safety component) coupled to the circuit component to monitor proper functioning of the circuit component. To monitor proper functioning of the circuit component, the supervisor component is to query the circuit component for diagnostic information, and to receive in response the diagnostic information queried. To facilitate the query and provision of the diagnostic information queried, the monitored circuit component is to indicate to the supervisor component when the monitored circuit component will be responsive to a query from the supervisor component for diagnostic information. To ensure the unavailability of the monitored circuit component is temporal, the supervisor component may monitor the duration of unavailability and ensure that the duration is compatible with the state of the circuit component. In embodiments, the circuit component may also be configured to initiate provision of diagnostic information to the supervisor component.

In embodiments, an electronic or circuit component may include a signal interface to couple the electronic component to a supervisor component responsible for monitoring the electronic or circuit component for proper operation; and logic circuitry coupled to the signal interface to signal the supervisor component, via the signal interface, to initiate provision of diagnostic information to the supervisor component, or to indicate to the supervisor component whether the electronic or circuit component will be responsive to a query from the supervisor component for diagnostic information.

In embodiments, a supervisor electronic component may comprise a signal interface to couple the supervisor electronic component to a supervisee component to monitor the supervisee component for proper operation; and logic circuitry coupled to the signal interface to receive, via the interface, signals from the supervisee component to initiate provision of diagnostic information to the supervisor component, or to indicate to the supervisor component that the supervisee component will be responsive to a query from the electronic component for diagnostic information.

In embodiments, the supervisor and supervisee components may further include diagnostic interfaces for the supervisor component to query the supervisee component for diagnostic information, and for the supervisee component to respond with the queried diagnostic information.

In embodiments, a supervisee electronic or circuit component may be a camera board or a safety island/hub, and a supervisor component may be a safety island/hub or a safety microcontroller. In embodiments, the mission critical or safety sensitive system may be a CA/AD system in a CA/AD vehicle, an industrial system, a software defined cockpit system, or other systems of the like.

In the description to follow, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For example, the phrase "detecting and/or correcting" means to cover any one of the scenarios of "detecting only," "detecting and correcting," or "correcting only."

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the terms "interface" and "engine" may refer to, be part of, or include an Application Specific Integrated Circuit (ASIC), an electronic circuit, a programmable combinational logic circuit (e.g., field programmable gate arrays (FPGA)), a processor (shared or dedicate) and/or memory (shared or dedicated) that execute a plurality of programming instructions of one or more software or firmware programs to provide the described functionality.

Hereinafter, a mission critical or safety sensitive system may simply be referred to as a system. A supervisee electronic or circuit component may simply be referred to as an electronic component, a circuit component or a supervisee component. Similarly, a supervisor electronic component may simply be referred to as an electronic component, or a supervisor component. Unless the context clearly indicate otherwise, the related terms should be respectively considered as synonymous to each other.

Referring now to FIG. 1, wherein an overview of a system incorporated with the electronic component monitoring technology of the present disclosure, in accordance with various embodiments, is illustrated. As shown, system 100 may include a supervisee component 102 configured to perform one or more functions or tasks, and supervisor component 104 configured to monitor supervisee component 102 for proper functional operation. To do so, supervisor component 104 may be configure to query supervisee component 102 from time to time for diagnostic information. To ensure supervisor component 104 would not mistaken the non-responsiveness of supervisee component 102 in providing diagnostic information as improper functioning of supervisee component 102 (e.g., because supervisee component 102 is busy), supervisee and supervisor components 102 and 104 are incorporated with the electronic component monitoring technology of the present disclosure, to advise supervisor component 104 as to when supervisee component 102 is able to response to inquiry from supervisor component 102 for diagnostic information. Further, the technology allows supervisor component 104 to properly determine whether supervisee component 102 is indeed busy or non-functional. In embodiments, the supervisee component 102 may also be configured to initiate provision of diagnostic information to the supervisor component 104.

In embodiments, supervisee component 102 and supervisor component 104 may respectively include logic circuits 112 and 122, signal interfaces 114 and 124, and diagnostic interfaces 116 and 126. Additionally, supervisor component 104 may further include watchdog timer 128.

Logic circuits 112 and 122 may be respectively configured to perform one or more desired functions or tasks. That is, logic circuit 112 may be configured to perform one or more application functions or tasks, while logic circuit 122 may be configured to perform at least the function or task of monitoring the proper functioning of supervisee component 102. Signal interfaces 114 and 124 may be respectively configured to couple the supervisee component 102 to supervisor component 104 to each other, to allow supervisee component to provide status information 132 to supervisor component 104. In particular, logic circuit 112 may be coupled to signal interface 114 to signal supervisor component 104, via signal interface 114, to initiate provision of diagnostic information to the supervisor component, or to indicate to supervisor component 104 whether it will be responsive to a query from supervisor component 104 for diagnostic information. Logic circuit 122 may be coupled to signal interface 124 to detect these signaling, and discern whether supervisee component 102 is initiating provision of diagnostic information to the supervisor component, or whether supervisee component 102 will be responsive to a query for diagnostic information.

In embodiments, to indicate to supervisor component 104 whether the supervisee component 102 will be responsive to a query from supervisor component 104 for diagnostic information, logic circuit 112 may be configured to signal supervisor component 104, via interface 114, its current state. In embodiments, the current state may be a selected one of:

a Power Off state where supervisee component 102 has no power, and not ready to respond to a query from supervisor component 104 for diagnostic information, a Power on state where supervisee component 102 is powering up, but not ready to respond to a query from supervisor component 104 for diagnostic information, a Reset state where supervisee component 102 is powered up, but not ready to respond to a query from supervisor component 104 for diagnostic information, an OK state where supervisee component 102 is powered up and operational, and ready to respond to a query from supervisor component 104 for diagnostic information, a not OK (NOK) state where supervisee component 102 is powered up, but not operational, detected a fatal or unrecoverable error, and may or may not be able to respond to a query from supervisor component 104 for diagnostic information, or a self-diagnostic state where supervisee component 102 is powered up, performing self-diagnostic, and should not be accessing the electronic component for diagnostic information until self-diagnostic is completed.

In embodiments, supervisee component 102 may execute bootstrap code, perform initialization or run self-test while in the reset state.

In embodiments, logic circuits 112 and 122 may be programmable circuits, such as a FPGA, programmed with logic to perform the desired functions or tasks. Signal interfaces 114 and 124 may respectively comprise at least 3 signal lines for asserting or de-asserting at least 3 corresponding signals 132, e.g., OK, NOK and Alert #. For these embodiments, logic circuit 112 may be configured to selectively assert or de-assert the at least 3 corresponding signals to signal supervisor component 104, its current state. In embodiments, logic circuit 112 may also be configured to assert or de-assert one of the signals 132, e.g., Alert #, to initiate provision of diagnostic information to logic circuit 122. In embodiments, signal interface 114 may be configured with 3 weak pull up resistors for generating the 3 respective signal lines. The 3 weak pull up resistors may be enabled by default until signal interface 114 is enabled. Once signal interface 114 is enabled, the weak pull up resistors may be disabled for two of the signal lines, e.g., the signal lines for the OK and NOK, which will be driven thereafter via push-pulled. The third signal line, e.g., ALERT #, may be driven open-drain instead.

In embodiments, logic circuit 112 may be configured to cause signal interface 114 to de-assert the at least 3 corresponding signals (e.g., with OK, NOK and Alert # respectively de-asserted to output logic "0"), to signal supervisor component 104 that it is currently in the Power Off state.

In embodiments, logic circuit 112 may be configured to cause signal interface 114 to transition the at least 3 corresponding signals from de-assertion to partial assertion (e.g., with OK, NOK and Alert # respectively transitions from logic "0" to partially asserted or weak pull up ("H")) to signal supervisor component 104 that it is currently in the Power On state, powering up.

In embodiments, logic circuit 112 may be configured to cause signal interface 114 to partially assert the at least 3 corresponding signals (e.g., with OK, NOK and Alert # respectively partially asserted or weak pull up ("H")) to signal supervisor component 104 that it is currently in a Reset state.

In embodiments, logic circuit 112 may be configured to cause signal interface 114 to assert a first of the at least 3 corresponding signals, and de-assert a second and a third of the at least 3 signals (e.g., with OK transitions from "H" to logic "1", driving push-pull, NOK transitions from "H" to logic "0", driving push-pull, and Alert # also transitions from H" to logic "0") to signal supervisor component 104 that it is currently in the OK state. In embodiments, while in the OK state, logic circuit 112 may be further configured to toggle a selected one of the second and third of the at least 3 signals (e.g., Alert #) to indicate to supervisor component 104, that there is a diagnostic message for supervisor component 104. Transmission of diagnostic messages will be further described below.

In embodiments, logic circuit 112 may be configured to cause signal interface 114 to assert a first and a second of the at least 3 corresponding signals, and partially assert a third of the at least 3 signals (e.g., with OK transitions from logic "1" to logic "0", and NOK from logic "0" to logic "1") to signal supervisor component 104 that it is currently in a Self-Diagnostic state. The third signal (e.g., Alert #) may be either partially asserted ("H") or de-asserted (logic "0").

Still referring to FIG. 1, in embodiments, diagnostic interfaces 116 and 126 may be configured to facilitate transmissions of query for diagnostic information from supervisor component 104 to supervisee component 102, and for transmissions of diagnostic messages 134 having diagnostic information responsive to the query from supervisee component 102 to supervisor component 104. Examples of diagnostic information may include, but are not limited to, error logging and error reporting. In embodiments, during transmissions of diagnostic messages 134, supervisee component 102 may be the slave device (Diag Slave), while supervisor component 104 may be the master device (Diag Master).

In embodiments, watchdog timer 128 may be employed by logic circuit 122 to set a time period threshold to monitor and ensure supervisee component 102 has not taken an excessive amount of time to transition from a selected one of the states to another selected one of the states. The use of watchdog timer 128 will be further described later with references to FIG. 3.

In embodiments, supervisee component 102 may implement a component safety policy that defines at least 3 types of errors Correctable Error—Errors that will be corrected by the component's hardware, e.g., if hardware detects single bit error correction code (ECC) failure and corrects it.

Recoverable Uncorrectable Error—Errors that may be corrected by software, i.e. software will try to recover from such error, if the recovery was not successful, it will result in Fatal Uncorrectable Error.

Fatal Unrecoverable Error—errors that can neither be corrected by software nor hardware.

In embodiments, supervisee component 102 may transition the ALERT # signal from 'H' to logic '0', if it has a diagnostic message for supervisor component 104, e.g., to indicate ALERT # will be asserted for a correctable error. Further, supervisee component 102 may transition from OK state 208 to NOK state 210 for any one of the following conditions:

The correctable error counts have exceeds the threshold set by the safety policy of that component.

The recoverable uncorrectable error condition is not recoverable, and became a fatal uncorrectable error.

Fatal uncorrectable error has occurred.

In a CA/AD system, the NOK signal may be asserted for a recoverable uncorrectable error condition as any delay in recovery may compromise the safety of the system. For other applications, recoverable uncorrectable error condition may be signaled over the diagnostic interface (via ALERT # assertion) and will not assert NOK unless there is a fatal uncorrectable error.

Figure 2:
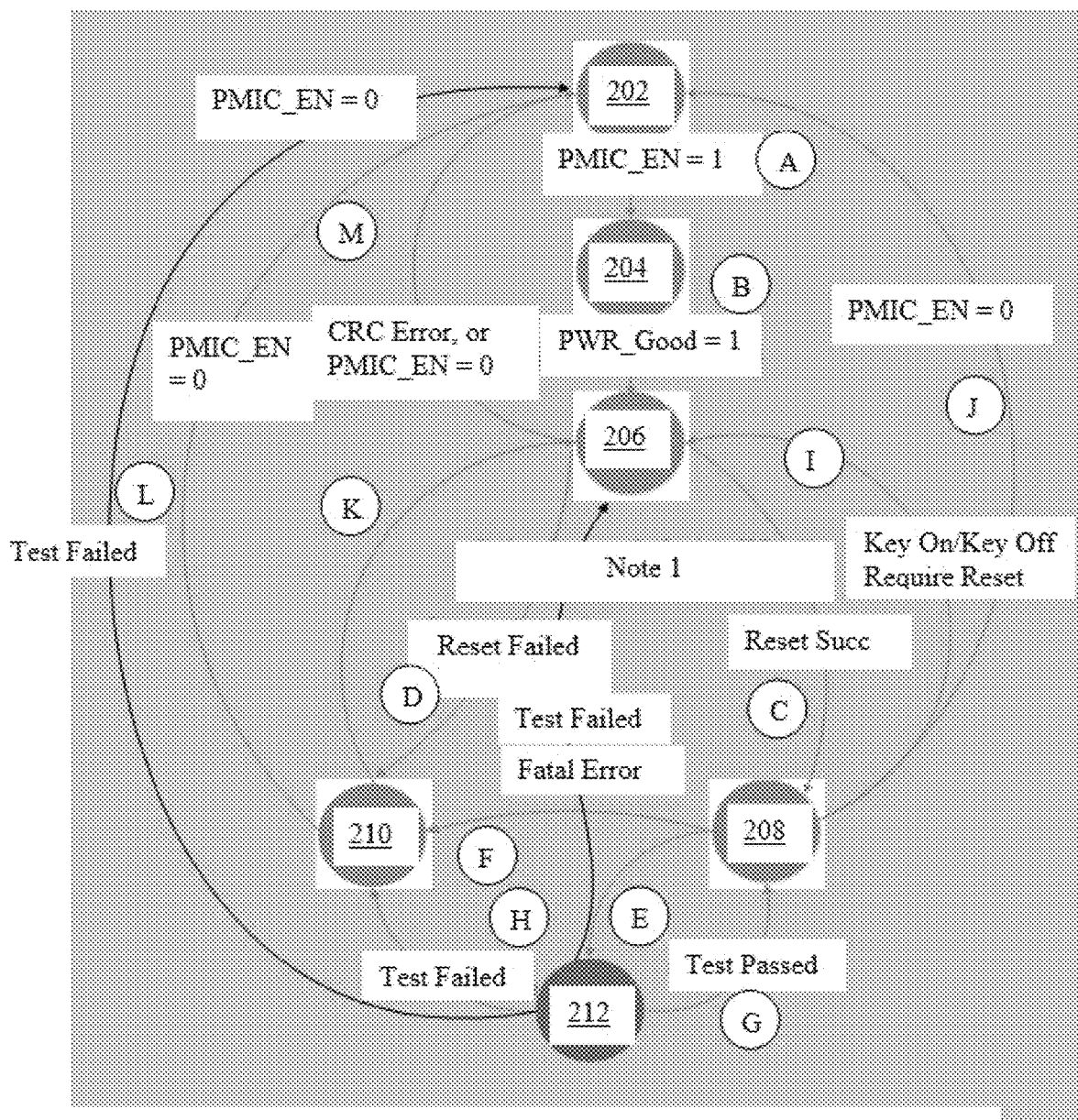
FIG. 2 illustrates an overview of the states of the supervisee component of FIG. 1, in accordance with various embodiments.

Referring now to FIG. 2, wherein an overview of the states of the supervisee component of FIG. 1, in accordance with various embodiments, is illustrated. As shown, and described earlier, the status of supervisee component 102 may comprise a Power Off state 202, a Power On state 204, a Reset state 206, an OK state 208, a NOK State 210, and a Self-Diagnostic state 212.

From Power Off state 202, supervisee component 102 may transition (A) to Power On state 204 to power on itself, when power is enabled (PMIC_EN=1). From Power On state 204, supervisee component 102 may transition (B) to Reset state 206, when it finishes powering up itself, i.e., power is determined to be good and stable (PWR_Good=1).

From Reset state 206, supervisee component 102 may transition (C) to operational OK state 208, if the component successfully reset, or transition (D) to non-operational NOK state 210, if the component failed to successfully reset. From operational OK state 208, supervisee component 102 may transition (E) to Self-Diagnostic state 212 to perform various diagnostics of itself, to ensure all elements, especially the essential elements, are properly functioning, or transition (F) to NOK state 210, if an operational failure condition is encountered. In embodiments, supervisee component 102 may transition to Self-Diagnostic state 212 on its own initiative or in response to a diagnostic command from supervisor component 104.

From Self-Diagnostic state 212, supervisee component 102 may transition (G) back to OK state 208, if the it passes the self-diagnostic tests, or transition (H) to non-operational NOK state 210 or Reset state 206, if the it fails to pass the essential self-diagnostic tests or encountered a fatal error. What constitutes essential self-diagnostic tests may be application dependent, depending on the function(s) or task(s) to be performed by supervisee component 102. From Self-Diagnostic state 212, supervisee component 102 may also transition (L) to Power Off state 202, if power is removed.

From operational OK state 208, supervisee component 102 may also transition (I) back to Reset state 206 to reset itself, in response to a key-on or key-off event requiring reset, or transition (J) back to Power Off state 202, if power is no longer enabled (PMIC_EN=0). From non-operational NOK state 210, supervisee component 102 may also transition (K) back to Reset state 206 to reset, or transition (L) back to Power Off state 202, if power is no longer enabled (PMIC_EN=0).

Finally, from Reset state 206, supervisee component 102 may also transition (L) back to Power Off state 202, if integrity check failed during reset (e.g., if a cyclic redundancy check error is encountered), or if power is no longer enabled (PMIC_EN=0). Note that, in general, supervisee component 102 may transition from any state to Power Off state 202, if power is suddenly removed.

Figure 3:
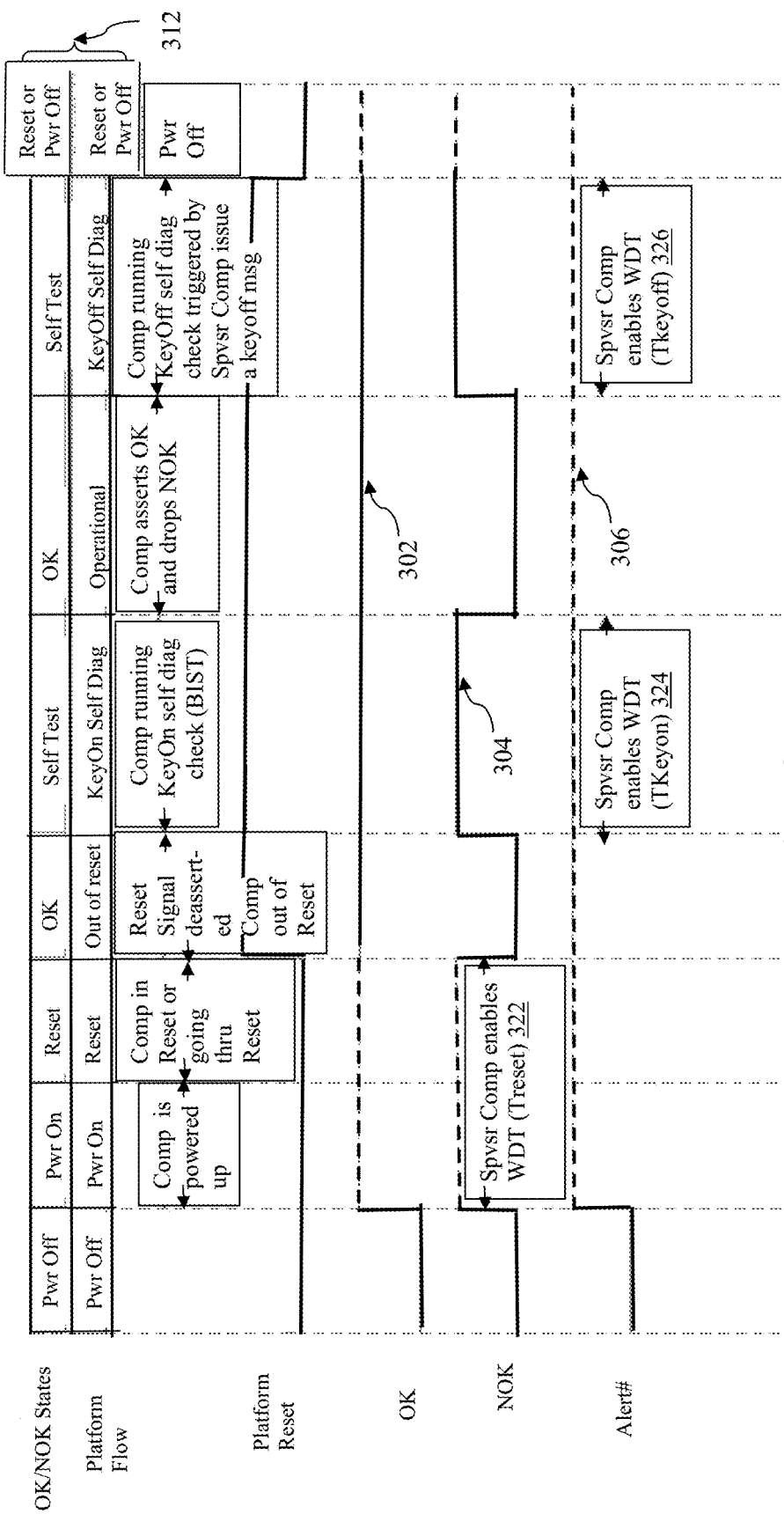
FIG. 3 illustrates an overview of the use of watchdog timer by the supervisor component of FIG. 1, in accordance with various embodiments.

Referring now to FIG. 3, wherein an overview of the employment of the watchdog timer by the supervisor component of FIG. 1, in accordance with various embodiments, is illustrated. As shown, supervisee component 102, in particular, logic circuit 112 may cause signal interface 114 to assert/de-assert the OK, NOK and Alert # signals to indicate the state supervisee component 102 is in, as it operates, transitions from state to state as earlier described. In embodiments, supervisee component 102 may have a defined time for transitioning from Reset state 206 to OK state 208 (Treset) 322. For these embodiments, supervisor component 104 may set watchdog timer (WDT) 128 for Treset 322, on detection that supervisee component 102 entered Reset state 206, to ensure that supervisee component 102 will transition to OK state 208 in the expected time. Supervisee component 102 may be considered as not functioning properly if it fails to transition to OK state 208 prior to the expiration of watchdog timer (WDT) 128 (set toTreset 322).

In embodiments, supervisee component 102 may have a defined time for transitioning from Self-Diagnostic state 212 to OK state 208, when performing key-on test (Tkeyon) 324. For these embodiments, supervisor component 104 may set watchdog timer (WDT) 128 for Tkeyon 324 on detection that supervisee component 102 entered Self-Diagnostic state 212 to perform key-on test, to ensure that supervisee component 102 will transition to OK state 208 in the expected time. Supervisee component 102 may be considered as not functioning properly if it fails to transition to OK state 208 prior to the expiration of watchdog timer (WDT) 128 (set to Tkeyon 324).

In embodiments, supervisee component 102 may have a defined time for transitioning from Self-Diagnostic state 212 to either OK state 208 or NOK state 210, when performing key-off test (Tkeyoff) 326. For these embodiments, supervisor component 104 may set watchdog timer (WDT) 128 for Tkeyoff 326 on detection that supervisee component 102 entered self-diagnostic state 212 to perform key-off test, to ensure that supervisee component 102 will transition to OK state 208 or NOK state 210 in the expected time. Supervisee component 102 may be considered as not functioning properly if it fails to transition to OK state 208 or NOK state 210 prior to the expiration of watchdog timer (WDT) 128 (set to Tkeyoff 326).

Figure 4:
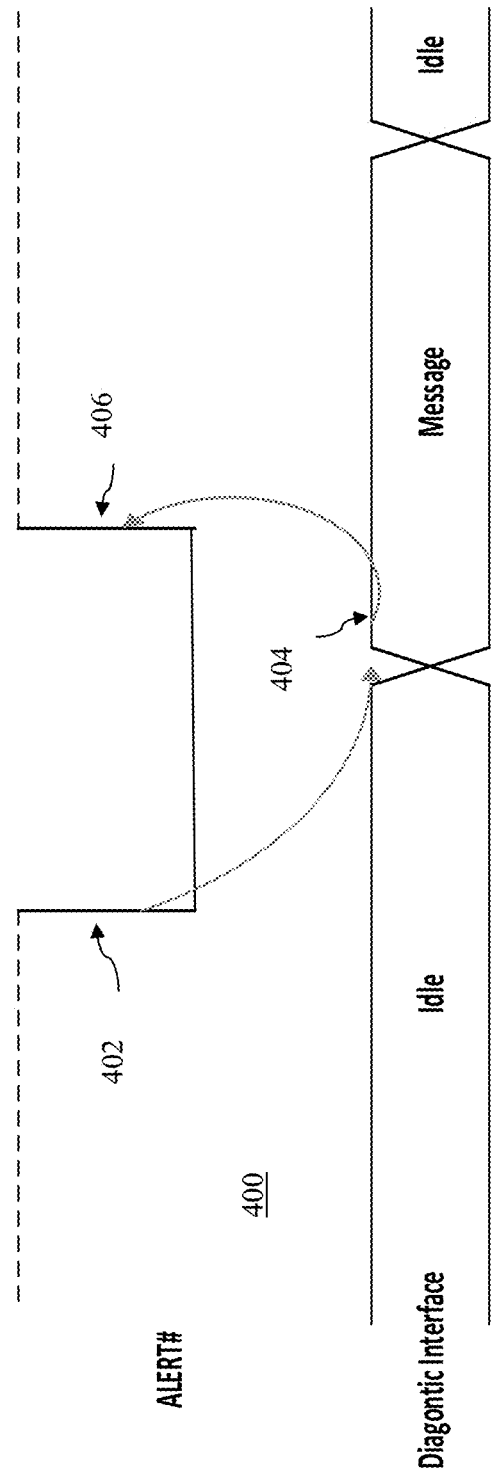
FIG. 4 is a timing diagram for the Alert # signal and transmission of diagnostic messages, in accordance with various embodiments.

Referring now to FIG. 4, wherein a timing diagram for the Alert # signal and transmission of diagnostic messages, in accordance with various embodiments, is illustrated. As shown, in embodiments, supervisee component 102 may assert Alert # low 402 to initiate provision of diagnostic information to supervisor component 104. Supervisee component 102 may continue to assert Alert # low 402 until it receives 404 a diagnostic message (e.g., a query for diagnostic information) from supervisor component 104. In embodiments, supervisee component 102 may de-assert Alert #404 (e.g., to "H") before receipt of the diagnostic message (e.g., a query for diagnostic information) from supervisor component 104 is finished.

Figure 5:
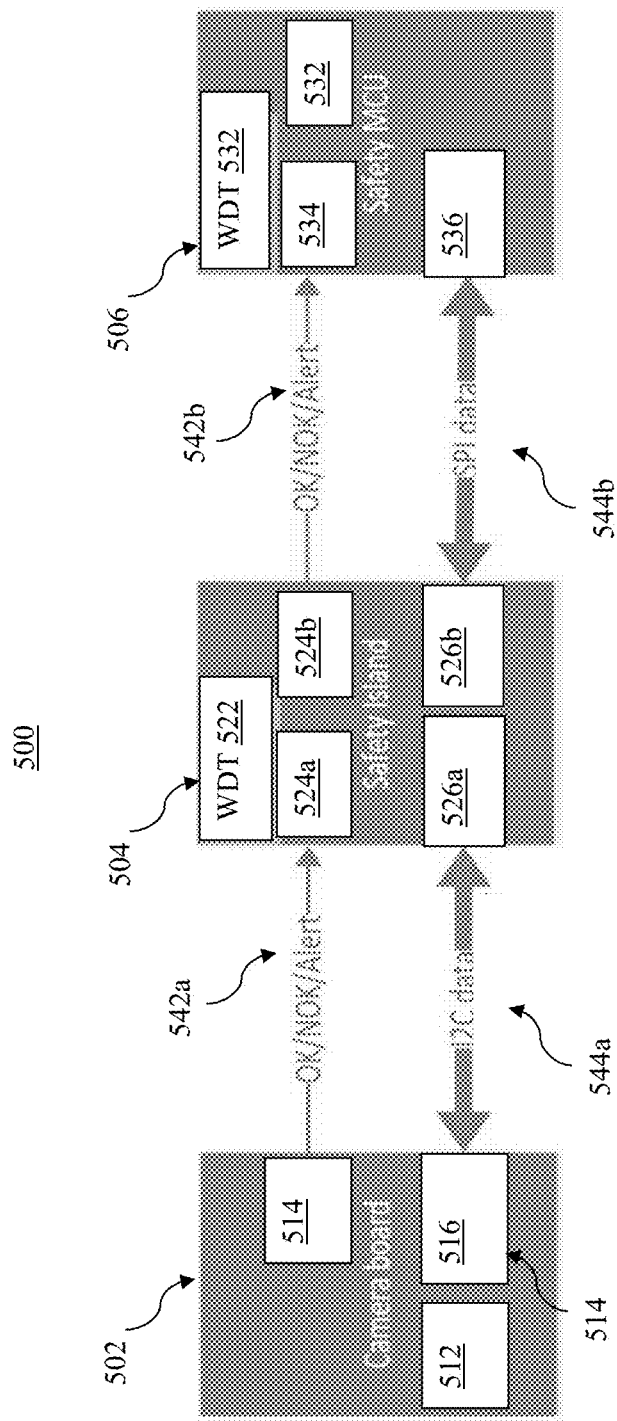
FIG. 5 is an example application of the electronic component monitoring technology of the present disclosure in a CA/AD system, in accordance with various embodiments.

Referring now to FIG. 5, wherein an example application of the electronic component monitoring technology of the present disclosure in a CA/AD system, in accordance with various embodiments, is illustrated. As shown, CA/AD system 500 in a CA/AD vehicle may include a camera board 502 configured to perform one or more imaging related functions or tasks, safety island (or hub) 504 configured to monitor camera board 502 for proper functional operation. Further, CA/AD system 500 may include safety microcontroller (MCU) 506 configured to monitor safety island (or hub) 504 for proper functional operation. In other words, safety island (or hub) 504 is at the same time, a supervisor component of camera board 502, and supervisee component of safety MCU 506.

As described earlier, each of camera board 502, safety island (hub) 504 and safety MCU 506 may include logic circuitry 512, 522 and 532 respectively configured with logic for performing the assigned functions or tasks of the element. Further, each of camera board 502, safety island (hub) 504 and safety MCU 506 may respectively include signal interfaces 514, 524a and 524b, and 534 for camera board 502 and safety island (hub) 504, in their supervisee roles, to respectively signal safety island (hub) 504 and safety MCU 506, in their supervisor roles, to indicate whether camera board 502 and safety island (hub) 504 are able to respond to a query for diagnostic information from safety island (hub) 504 and safety MCU 506.

Still further, each of camera board 502, safety island (hub) 504 and safety MCU 506 may respectively include diagnostic interfaces 516, 526a and 526b, and 536 for camera board 502 and safety island (hub) 504, in their supervisee roles, to respectively receive query for diagnostic information from signal safety island (hub) 504 and safety MCU 506, in their supervisor roles, and to respectively provide in response, diagnostic information from camera board 502 and safety island (hub) 504 to safety island (hub) 504 and safety MCU 506.

In embodiments, diagnostic interfaces 516 and 526a may implement an I$^2$C interface between camera board 502 and safety island (hub) 504, while diagnostic interfaces 526b and 536 may implement a serial peripheral interface (SPI) between safety island (hub) 504 and safety MCU 506, for exchanges of diagnostic messages.

Thus, methods and apparatuses for monitoring electronic components have been described. Example embodiments described include, but are not limited to, Example 1, which is an electronic component, comprising: an interface to couple the electronic component to a supervisor component responsible for monitoring the electronic component for proper operation; and logic circuitry coupled to the interface to signal the supervisor component, via the interface, to initiate provision of diagnostic information to the supervisor component, or to indicate to the supervisor component whether the electronic component will be responsive to a query from the supervisor component for diagnostic information.

Example 2 is example 1, wherein to indicate to the supervisor component whether the electronic component will be responsive to a query from the supervisor component for diagnostic information, the logic circuitry is to signal the supervisor component, via the interface, a current state of the electronic component.

Example 3 is example 2, wherein the current state of the electronic component is a selected one of: a power off state where the electronic component has no power, and not ready to respond to a query from the supervisor component for diagnostic information, a power on state where the electronic component is powering up, but not ready to respond to a query from the supervisor component for diagnostic information, a reset state where the electronic component is powered up, but not ready to respond to a query from the supervisor component for diagnostic information, an OK state where the electronic component is powered up and operational, and ready to respond to a query from the supervisor component for diagnostic information, a not OK (NOK) state where the electronic component is powered up, detected a fatal or unrecoverable error, and may or may not be able to respond to a query from the supervisor component for diagnostic information, or a self-diagnostic state where the electronic component is powered up, performing self-diagnostic, and the supervisor component should not be accessing the electronic component for diagnostic information until self-diagnostic is completed.

Example 4 is example 2, wherein the interface comprises at least 3 signal lines for asserting or de-asserting at least 3 corresponding signals, and the logic circuitry is to selectively assert or de-assert the at least 3 corresponding signals to signal the supervisor component, via the interface, the current state of the electronic component.

Example 5 is example 4, wherein the logic circuitry is to de-assert the at least 3 corresponding signals to signal the supervisor component, via the interface, that the electronic component is currently in a power off state, where the electronic component has no power and not ready to respond to a query from the supervisor component for diagnostic information.

Example 6 is example 4, wherein the logic circuitry is to transition the at least 3 corresponding signals from de-assertion to partial assertion to signal the supervisor component, via the interface, that the electronic component is currently in a power on state, where the electronic component is powering up, but not ready to respond to a query from the supervisor component for diagnostic information.

Example 7 is example 4, wherein the logic circuitry is to partially assert the at least 3 corresponding signals to signal the supervisor component, via the interface, that the electronic component is currently in a reset state, where the electronic component is powered up, but not ready to respond to a query from the supervisor component for diagnostic information.

Example 8 is example 4, wherein the logic circuitry is to assert a first of the at least 3 corresponding signals, and de-assert a second and a third of the at least 3 signals to signal the supervisor component, via the interface, that the electronic component is currently in an OK state, where the electronic component is powered up and operational, and ready to respond to a query from the supervisor component for diagnostic information; and wherein the logic circuitry is to further toggle a selected one of the second and third of the at least 3 signals to indicate to the supervisor component, via the interface, that the electronic component has a message for the supervisor component.

Example 9 is example 4, wherein the logic circuitry is to de-assert a first of the at least 3 corresponding signals, assert a second of the at least 3 signals, and de-assert or partially assert a third of the at least 3 signals to signal the supervisor component, via the interface, that the electronic component is currently in a not OK state, where the electronic component is powered up, detected a fatal or unrecoverable error, and may or may not be able to respond to a query from the supervisor component for diagnostic information.

Example 10 is example 4, wherein the logic circuitry is to assert a first and a second of the at least 3 corresponding signals, and partially assert a third of the at least 3 signals to signal the supervisor component, via the interface, that the electronic component is currently in a self-diagnostic state, where the electronic component is powered up, performing self-diagnostic, and the supervisor component should not be accessing the electronic component for diagnostic information until self-diagnostic is completed.

Example 11 is example 3, wherein at least 3 corresponding signals comprise a OK signal, a NOK signal and an Alert # signal.

Example 12 is any one of examples 1-11, wherein the interface is a first interface, and the electronic component further comprises a second interface to receive a query from the supervisor component for diagnostic information, the query being forwarded to the logic circuitry to respond, or to send diagnostic information to the supervisor component to respond to a query from the supervisor component for diagnostic information, the diagnostic information sent being provided by the logic circuitry.

Example 13 is an electronic component, comprising: an interface to couple the electronic component to a supervisee component to monitor the supervisee component for proper operation; and logic circuitry coupled to the interface to receive, via the interface, signals from the supervisee component to initiate provision of diagnostic information to the electronic component, or to indicate to the electronic component that the supervisee component will be responsive to a query from the electronic component for diagnostic information.

Example 14 is example 13, wherein the interface is a first interface, and the electronic component further comprises a second interface to send a query to a supervisee component for diagnostic information, the query being sent on behalf of the logic circuitry, or to receive diagnostic information from the supervisee component in response to a query from the electronic component for diagnostic information, the diagnostic information received being forwarded to the logic circuitry.

Example 15 is example 13 or 14, further comprising a watchdog timer coupled to the logic circuitry, and use by the logic circuitry to ensure the supervisee component has not taken an excessive amount of time to transition from a power on or a reset state to an OK state.

Example 16 is example 13 or 14, further comprising a watchdog timer coupled to the logic circuitry, and use by the logic circuitry to ensure the supervisee component has not taken an excessive amount of time to transition from a self-diagnostic state to an OK state when the supervisee component is performing a key-on self test.

Example 17 is example 13 or 14, further comprising a watchdog timer coupled to the logic circuitry, and use by the logic circuitry to ensure the supervisee component has not taken an excessive amount of time to transition from a self-diagnostic state to either an OK state or a NOK state, when the supervisee component is performing a key-off self test.

Example 18 is a system, comprising: a circuit component to perform a function; and a safety component coupled to the circuit component to monitor proper functioning of the circuit component, wherein to monitor proper functioning of the circuit component includes to query the circuit component for diagnostic information, and to receive in response the diagnostic information queried; wherein the circuit component to initiate provision of diagnostic information to the safety component, or to indicate to the safety component when the circuit component will be responsive to a query from the safety component for diagnostic information.

Example 19 is example 18, further comprising at least 3 signal lines to couple the circuit component to the safety component, to provide at least 3 corresponding signals from the circuit component to the safety component to indicate whether the circuit component will be responsive to a query from the safety component for diagnostic information.

Example 20 is example 18, wherein the circuit component is a camera board, a safety hub or a microcontroller.

Example 21 is example 18, wherein the safety component is a safety hub, and the system further comprises an I$^2$C interface to couple the circuit component to the safety component, the safety component to send a query to the circuit component for diagnostic information and to receive in response the queried diagnostic information through the I$^2$C interface, or the safety component is a safety microcontroller, and the system further comprises a serial peripheral interface (SPI) to couple the circuit component to the safety component, the safety component to send a query to the circuit component for diagnostic information and to receive in response the queried diagnostic information through the SPI.

Example 22 is example 18, wherein to indicate to the safety component whether the circuit component will be responsive to a query from the safety component for diagnostic information, the circuit component is to signal the safety component, a current state of the circuit component.

Example 23 is example 22, wherein the safety component includes a first interface to receive the current state of the circuit component, and a second interface to send the query to to the circuit component for diagnostic information, or to receive diagnostic information from the circuit component in response to the query from the safety component for diagnostic information.

Example 24 is example of claim 18, wherein the safety component further comprises a watchdog timer to ensure the circuit component has not taken an excessive amount of time to transition from a first state to a second state.

Example 25 is any one of examples 18-24, wherein the system is a computer-assisted or autonomous driving (CA/AD) system in a CA/AD vehicle, an industrial system, an avionics system, or a medical system.

These embodiments may provide at least the following advantages over prior art solutions. With the disclosed technology, ambiguity with the OK/NOK signals have been removed. This can be well utilized by CA/AD systems implementing functional safety concepts that require a component to signal its current state (OK/NOK) to a supervisor component (e.g., Safety island or Safety MCU) that's monitoring its state across all power domains/states. Further the disclosed technology may have advantages with respect to hierarchical platform, i.e. current CPU and platform controller hub (HUB) with numerous general purpose inputs/outputs (GPIOs) to indicate errors. If all of these errors can be communicated via the 3 signal wires in place of having separate pins, it will no longer necessary to re-design the motherboard every time a GPIO change occurs. Further, with less number of pins, the overall bill of material cost may be reduced. For example, the example application illustrated with references to FIG. 5, shows how the Camera board interfaces with the Safety island, and can report various type of errors to Safety island/hub with fewer number of pins.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An electronic component, comprising:
   an interface to couple the electronic component to a supervisor component responsible for monitoring the electronic component for proper operation; and
   logic circuitry coupled to the interface to signal the supervisor component, via the interface, to initiate provision of diagnostic information to the supervisor component, or to indicate to the supervisor component whether the electronic component will be responsive to a query from the supervisor component for diagnostic information;
   wherein the interface comprises at least three signal lines for asserting or de-asserting at least three corresponding signals, and the logic circuitry is to selectively assert or de-assert the at least three corresponding signals to signal the supervisor component, via the interface, a current state of the electronic component, including de-assertion of the at least three corresponding signals to signal the supervisor component, via the interface, that the electronic component is currently in a power off state, where the electronic component has no power and is not ready to respond to a query from the supervisor component for diagnostic information.

2. The electronic component of claim 1, wherein the current state of the electronic component is:
   a power off state where the electronic component has no power, and is not ready to respond to a query from the supervisor component for diagnostic information,
   a power on state where the electronic component is powering up, but not ready to respond to a query from the supervisor component for diagnostic information,
   a reset state where the electronic component is powered up, but not ready to respond to a query from the supervisor component for diagnostic information,
   an OK state where the electronic component is powered up and operational, and ready to respond to a query from the supervisor component for diagnostic information, a not OK (NOK) state where the electronic component is powered up, detected a fatal or unrecoverable error, and may or may not be able to respond to a query from the supervisor component for diagnostic information, or a self-diagnostic state where the electronic component is powered up, performing self-diagnostic, and the supervisor component should not be accessing the electronic component for diagnostic information until self-diagnostic is completed.

3. The electronic component of claim 1, wherein the logic circuitry is to further respectively transition the at least three corresponding signals from de-assertion to a weak pull up high state to signal the supervisor component, via the interface, that the electronic component is currently in a power on state, where the electronic component is powering up, and not ready to respond to a query from the supervisor component for diagnostic information.

4. The electronic component of claim 1, wherein the logic circuitry is to respectively transition the at least three corresponding signals to a weak pull up high state to signal the supervisor component, via the interface, that the electronic component is currently in a reset state, where the electronic component is powered up, and not ready to respond to a query from the supervisor component for diagnostic information.

5. The electronic component of claim 1, wherein the logic circuitry is to assert a first of the at least three corresponding signals, and de-assert a second and a third of the at least three signals to signal the supervisor component, via the interface, that the electronic component is currently in an OK state, where the electronic component is powered up and operational, and ready to respond to a query from the supervisor component for diagnostic information; and wherein the logic circuitry is to further toggle a selected one of the second and third of the at least three signals to indicate to the supervisor component, via the interface, that the electronic component has a message for the supervisor component.

6. The electronic component of claim 1, wherein the logic circuitry is to de-assert a first of the at least three corresponding signals, assert a second of the at least three signals, and de-assert or transition a third of the at least three signals to a weak pull up high state to signal the supervisor component, via the interface, that the electronic component is currently in a not OK state, where the electronic component is powered up, detected a fatal or unrecoverable error, and may or may not be able to respond to a query from the supervisor component for diagnostic information.

7. The electronic component of claim 1, wherein the logic circuitry is to assert a first and a second of the at least three corresponding signals, and transition a third of the at least three signals to a weak pull up high state to signal the supervisor component, via the interface, that the electronic component is currently in a self-diagnostic state, where the electronic component is powered up, performing self-diagnostic, and the electronic component is not being accessed by the supervisor component for diagnostic information until self-diagnostic is completed.

8. The electronic component of claim 2, wherein at least three corresponding signals comprise an OK signal, a NOK signal and an Alert # signal.

9. The electronic component of claim 1, wherein the interface is a first interface, and the electronic component further comprises a second interface to receive a query from the supervisor component for diagnostic information, the query being forwarded to the logic circuitry to respond, or to send diagnostic information to the supervisor component to respond to a query from the supervisor component for diagnostic information, the diagnostic information sent being provided by the logic circuitry.

10. An electronic component, comprising:
an interface to couple the electronic component to a supervisee component to monitor the supervisee component for proper operation;
logic circuitry coupled to the interface to receive, via the interface, signals from the supervisee component to initiate provision of diagnostic information to the electronic component, or to indicate to the electronic component that the supervisee component will be responsive to a query from the electronic component for diagnostic information; and
a watchdog timer coupled to the logic circuitry, and use by the logic circuitry to ensure the supervisee component has not taken an amount of time in excess of a timing threshold to transition from a self-diagnostic state to an OK state when the supervisee component is performing a key-on self-test.

11. The electronic component of claim 10, wherein the interface is a first interface, and the electronic component further comprises a second interface to send a query to a supervisee component for diagnostic information, the query being sent on behalf of the logic circuitry, or to receive diagnostic information from the supervisee component in response to the query from the electronic component for diagnostic information, the diagnostic information received being forwarded to the logic circuitry.

12. The electronic component of claim 10, further comprising a watchdog timer coupled to the logic circuitry, and use by the logic circuitry to ensure the supervisee component has not taken an amount of time in excess of a timing threshold to transition from a power on or a reset state to an OK state.

13. The electronic component of claim 10, further comprising a watchdog timer coupled to the logic circuitry, and use by the logic circuitry to ensure the supervisee component has not taken an amount of time in excess of a timing threshold to transition from a self-diagnostic state to either an OK state or a NOK state, when the supervisee component is performing a key-off self-test.

14. A system, comprising:
a circuit component to perform a function; and
a safety component coupled to the circuit component to monitor proper functioning of the circuit component, wherein to monitor proper functioning of the circuit component includes to query the circuit component for diagnostic information, and to receive in response the diagnostic information queried;
wherein the circuit component is to initiate provision of diagnostic information to the safety component, or to indicate to the safety component when the circuit component will be responsive to a query from the safety component for diagnostic information;
wherein the circuit component and the safety component are coupled to each other via an interconnect that includes at least three signal lines for asserting or de-asserting at least three corresponding signals to signal the safety component, a current state of the circuit component, including respective transition of the at least three corresponding signals from de-assertion to a weak pull up high state to signal the safety component, that the circuit component is currently in a power on state, where the circuit component is powering up, and not ready to respond to a query from the safety component for diagnostic information.

15. The system of claim 14, further comprising at least three signal lines to couple the circuit component to the safety component, to provide at least three corresponding signals from the circuit component to the safety component to indicate whether the circuit component will be responsive to a query from the safety component for diagnostic information.

16. The system of claim 14, wherein the circuit component is a camera board.

17. The system of claim 14, wherein the safety component is a safety hub, and the system further comprises an I²C interface to couple the circuit component to the safety component, the safety component to send a query to the circuit component for diagnostic information and to receive in response the queried diagnostic information through the I²C interface, or the safety component is a safety microcontroller, and the system further comprises a serial peripheral interface (SPI) to couple the circuit component to the safety component, the safety component to send a query to the circuit component for diagnostic information and to receive in response the queried diagnostic information through the SPI.

18. The system of claim 14, wherein to indicate to the safety component whether the circuit component will be responsive to a query from the safety component for diagnostic information, the circuit component is to signal the safety component, a current state of the circuit component.

19. The system of claim 18, wherein the safety component includes a first interface to receive the current state of the circuit component, and a second interface to send the query to the circuit component for diagnostic information, or to receive diagnostic information from the circuit component in response to the query from the safety component for diagnostic information.

20. The system of claim 14, wherein the safety component further comprises a watchdog timer to ensure the circuit component has not taken an amount of time in excess of a timing threshold to transition from a first state to a second state.

21. The system of claim 14, wherein the system is a computer-assisted or autonomous driving (CA/AD) system in a CA/AD vehicle.

* * * * *